United States Patent [19]

Tordenmalm

[11] Patent Number: 4,475,333
[45] Date of Patent: Oct. 9, 1984

[54] DEVICES FOR LIMITING THE POWER OUTPUT OF A HYDRAULIC ASSEMBLY

[75] Inventor: L. Östen Tordenmalm, S:a Sandby, Sweden

[73] Assignee: Akermans Verkstad AB, Eslöv, Sweden

[21] Appl. No.: 158,348

[22] Filed: Jun. 10, 1980

[30] Foreign Application Priority Data

Jun. 15, 1979 [SE] Sweden .................................. 7905272

[51] Int. Cl.³ ............................................. F16H 39/46
[52] U.S. Cl. ....................................... 60/395; 60/420; 60/431; 60/449
[58] Field of Search ........... 60/395, 431, 449, DIG. 2, 60/420, 484, 486; 91/458

[56] References Cited

U.S. PATENT DOCUMENTS

| | | | |
|---|---|---|---|
| 2,526,665 | 10/1950 | Hull et al. | 60/395 |
| 3,478,513 | 11/1969 | Ma et al. | 60/395 |
| 3,788,076 | 1/1974 | Lansky et al. | 60/431 X |
| 4,017,216 | 4/1977 | Moore | 417/216 |
| 4,017,218 | 4/1977 | Burk et al. | 417/216 |
| 4,017,219 | 4/1977 | Born et al. | 60/449 |
| 4,029,439 | 6/1977 | Adams | 60/449 |
| 4,065,228 | 12/1977 | McMillan | 60/486 |
| 4,073,141 | 2/1978 | Lohbauer | 60/486 |
| 4,103,489 | 8/1978 | Fletcher et al. | 60/449 |
| 4,123,907 | 11/1978 | Bianchetta et al. | 60/486 |
| 4,158,290 | 6/1979 | Cornell | 60/449 |
| 4,175,628 | 11/1979 | Cornell et al | 60/395 |
| 4,180,979 | 1/1980 | Cornell | 60/395 |

FOREIGN PATENT DOCUMENTS 2313853 11/1973 Fed. Rep. of Germany .
2331617  1/1975 Fed. Rep. of Germany .

Primary Examiner—George L. Walton
Attorney, Agent, or Firm—Leonard Bloom

[57] ABSTRACT

To limit the power output of a hydraulic assembly consisting of plural driven hydraulic motors, hydraulic pumps driving said motors, a single pump driving motor and control means for controlling the hydraulic flow to said drive hydraulic motors, a controller is provided which is supplied with an input signal from a subtractor which in turn is supplied with signals from a reference value setting device and an actual value setting device, the actual value setting device sensing the speed of the driving motor. An output signal of the controller is applied to all of the control means and is multiplied in each control means by a signal proportional to the setting of said control means, in order to obtain the flow control signal.

9 Claims, 1 Drawing Figure

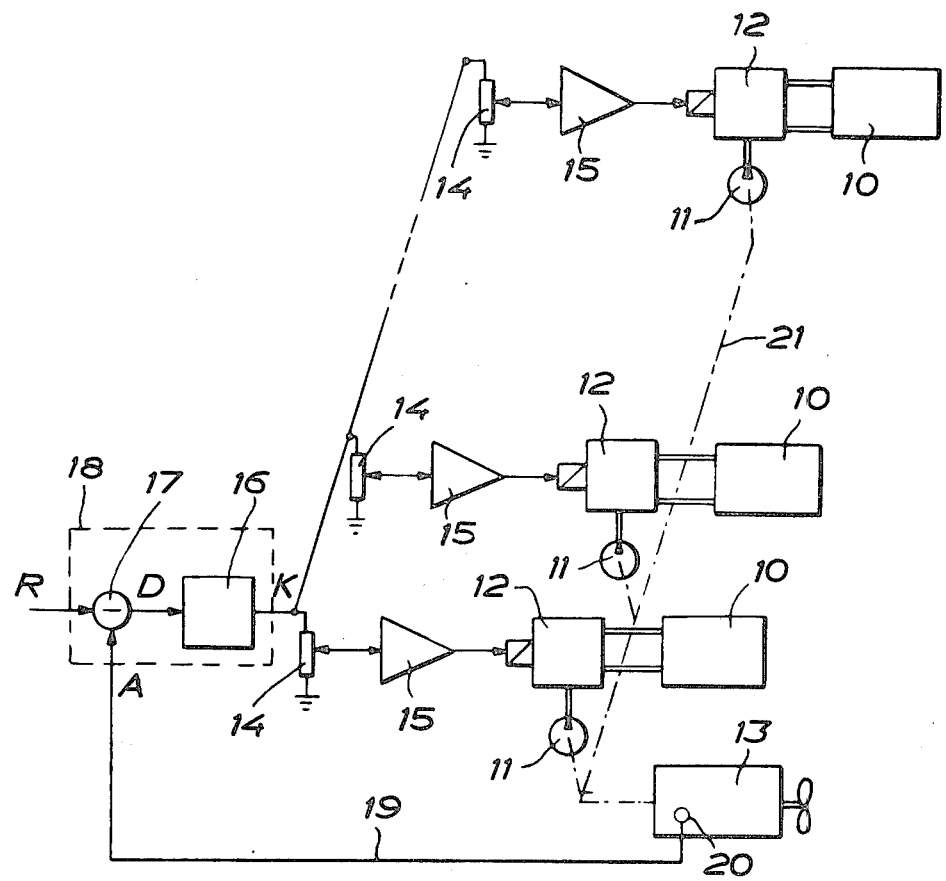

DEVICES FOR LIMITING THE POWER OUTPUT OF A HYDRAULIC ASSEMBLY

BACKGROUND OF THE INVENTION

The present invention relates to a device for limiting the power output of a hydraulic assembly comprising plural hydraulic driven motors, hydraulic pumps for driving said driven motors, a pump driving motor and control means controlling the hydraulic flow from each pump to the driven hydraulic motor or motors coupled therewith.

In a hydraulic assembly of the above-mentioned type, the pumps of the driven hydraulic motors are coupled with the output shaft of the driving motor via a gearbox, and if the hydraulic power output exceeds the available power output of the driving motor, the latter will be overloaded, resulting in a decrease of speed or even a full stop of the driving motor. If the driving motor is an electric motor, the full stop may result in the destruction of the motor. For this reason, the pumps have to be so dimensioned that their combined maximum power does not exceed that of the driving motor, even if it is only in exceptional cases that all pumps are run simultaneously at maximum power. This means that the available power of the driving motor cannot be optimally utilized. It is, of course, a disadvantage that the pumps for reasons of safety have to be dimensioned to be able to meet with a situation that arises relatively seldom, and it has long been desired that it should be possible automatically to limit the power output of the pumps so that the sum of the maximum power output may safely exceed that of the driving motor. In this manner, it would be possible to run one or more—but not all—of the pumps at maximum power, and as soon as the total power output approaches the available power output of the driving motor, the power output would be reduced to a value immediately below the available power output, without incurring the risk of overloading.

SUMMARY AND OBJECTS OF THE INVENTION

It is the object of the present invention to satisfy these requirements by providing an extremely simple, inexpensive and reliable device.

To this end, a controller is adapted to supply each control means with a signal multiplied by a signal proportional to the setting of said control means, for obtaining the flow control signal of said control means, and a subtractor is connected to a reference value setting device and to a transducer sensing the speed of the driving motor for obtaining a difference signal that can be applied to said controller for controlling the output signal thereof to said control means.

According to a preferred embodiment of the invention, the controller is of the PID (proportional plus floating plus derivative) type and may consist, like said control means and said subtractor, of electrical means.

The invention will be described in more detail in the following, reference being had to the accompanying drawing which illustrates an embodiment of the invention in the form of a circuit diagram.

DESCRIPTION OF THE PREFERRED EMBODIMENT

The drawing shows a number of hydraulic motors 10 which may be either piston and cylinder assemblies or torque motors. The hydraulic motors 10 are coupled each with one pump 11 via a solenoid valve 12. Although each hydraulic motor shown in the drawing is provided with a pump, several such motors are frequently coupled with a common pump. The pumps are operated by a driving motor 13 which may be either a diesel engine or an electric motor. As shown by a dash and dot line 21, all pumps are connected to the output shaft of the driving motor 13 via a gearbox (not shown). For controlling the supply of pressure medium from the pumps 11 to the hydraulic motors 10, each pump 11 has a control means 14 which, in the drawing, is shown as a potentiometer connected to an amplifier 15 which in turn is connected to the solenoid valve 12. It will be appreciated that it is possible, by changing the setting of the potentiometer, to control the supply of pressure medium by the solenoid valve 12. All control means 14 are connected to a controller 16 which in turn is connected to a subtractor 17. The components 16 and 17 are preferably enclosed in a common casing, as shown at 18.

A reference value setting device (not shown) supplies the subtractor with a signal R corresponding to a predetermined nominal value. An actual value setting device 20 preferably a transducer is disposed on the driving motor 13 for sensing the speed of said driving motor and supplying the subtractor 17 via a line 19 with a signal A responsive to said actual value. In the subtractor, the reference value signal R is compared, in conventional manner, with the actual value signal A, and the resulting signal D is applied to the controller 16. The controller 16 is of the PID (proportional plus floating plus derivative) type and is adapted to supply a signal K which is applied to the control means 14. The signal supplied by said control means 14 is a product of the controller signal K and the setting of the control means.

The device according to the invention operates as follows.

The reference value setting device is preset to a value corresponding to the lowest acceptable speed of the driving motor 13, and the signal R corresponding to this value and the signal A responsive to the motor speed are continuously compared in the subtractor 17. As long as the actual value is greater than the reference value, the signal D from the subtractor 17 does not actuate the controller 16 transmitting the signal K which normally equals one. However, when the actual value falls below or, because of the derivative function of the controller 16, approaches the reference value, the controller 16 responds and the signal K is reduced and obtains a value below one, as a result of which the control means signal reduces the flow and thus the power output so that the speed of the driving motor is stabilized at the reference value.

As will be apparent from the above, the present invention provides an extremely simple and reliable device for limiting the power output, said device being based upon a simple speed measurement instead of the far more complicated measurement of the total power output. Furthermore, it is possible, by means of a slightly more complicated controller 16 to connect the power stages in such a manner that, as the speed decreases, an increasing number of power stages participate in the control.

What I claim and desire to secure by Letters Patent is:

1. A control system for controlling by limiting power output of a hydraulic assembly used in an excavator or the like which comprises in combination:

a single driving motor, plural hydraulic pump means operatively powered by said driving motor, plural driven motors powered by said plural pump means, there being an equal number of said driven motors and pump means matched so that one said pump means powers one said driven motor, means for sensing the speed of said driving motor, means for continuously comparing the speed sensed with a standard, said comparing means adapted to energize a controller when said driving motor is about to be overloaded, said controller having means to independently alter the hydraulic flow rate of each said plural pump means by priority and thereby relieve said driving motor before being overloaded whereby the power output of said plural pump means is limited so that the sum of the maximum power output of said plural pump means may safely exceed that of the driving motor.

2. The device of claim 1 wherein said controller alters the hydraulic flow rate of each said plural pump means by providing a signal from said controller to plural valve means one interposed between each said plural pump means and each said plural driven motors to thereby alter the output of each said plural pump means.

3. The device of claim 2 wherein adjustable control means are disposed between said controller and each said plural valve means to alter the threshold of each energization of said plural valve means.

4. The device of claim 3 wherein plural amplifier means are interposed between each said plural control means and each said plural valve means to magnify the signal to said valve means.

5. The device of claim 4 wherein plural said pump means, valve means, control means, amplifier means and driven motors are disposed in parallel sets relative to said controller and said driving engine.

6. The device of claim 5 wherein said control means comprises variable potentiometer means, said comparing means comprises a subtractor, said speed sensing means is a transducer.

7. A device as claimed in claim 6, in which said controller (16) is of the PID type (proportional plus floating plus derivative).

8. A control system for limiting the power output of a hydraulic servomotor assembly comprising hydraulic motors, constant pumps supplying hydraulic fluid to said motors, a common pump driving motor and control means supplying a flow control signal to valve means for controlling the hydraulic flow from each pump to the hydraulic motor or motors connected therewith, an electrical controller, said electrical controller being adapted to supply each control means with a signal of a value less than or equal to one multiplied in said control means (14) by a signal proportional to the setting of said control means for obtaining the flow control signal of said control means, an electrical subtractor, a reference value setting device for setting a nominal value corresponding to the lowest acceptable speed of the pump driving motor, and a transducer sensing the speed of the driving motor, said electrical subtractor being connected to said reference value setting device and said transducer for obtaining a difference signal that is applied to said controller for modulating the output signal thereof whereby each said hydraulic motor can be independently controlled based on priorities established by said control means.

9. A device as claimed in claim 8 wherein the controller is of the PID type (proportional plus floating plus derivative).

* * * * *